(12) United States Patent
Chou (10) Patent No.: US 9,027,608 B2
(45) Date of Patent: May 12, 2015

(54) VEHICLE-CARRIED AIR COMPRESSOR DEVICE

(71) Applicant: Wen-San Chou, Tainan (TW)

(72) Inventor: Wen-San Chou, Tainan (TW)

( * ) Notice: Subject to any disclaimer, the term of this patent is extended or adjusted under 35 U.S.C. 154(b) by 264 days.

(21) Appl. No.: 13/792,123

(22) Filed: Mar. 10, 2013

(65) Prior Publication Data

US 2013/0284312 A1 Oct. 31, 2013

(30) Foreign Application Priority Data

Apr. 27, 2012 (TW) .............................. 101115292 A (51) Int. Cl.
*B29C 73/02* (2006.01)
*B60S 5/04* (2006.01)
*B29C 73/16* (2006.01)
*F16K 15/20* (2006.01)
*B60C 29/06* (2006.01)
*B29L 30/00* (2006.01)

(52) U.S. Cl.
CPC ................ *B60S 5/04* (2013.01); *B29L 2030/00* (2013.01); *B29C 73/166* (2013.01); *F16K 15/20* (2013.01); *B60C 29/064* (2013.01)

(58) Field of Classification Search
CPC ...... B29C 73/02; B29C 73/025; B29C 73/16; B29C 73/163; B29C 73/166
USPC .............................................. 141/38; 152/415
See application file for complete search history.

(56) References Cited

U.S. PATENT DOCUMENTS

| | | | | |
|---|---|---|---|---|
| 5,819,781 A * | 10/1998 | Wu | ................................ | 137/231 |
| 6,283,172 B1 * | 9/2001 | Thurner | .......................... | 141/38 |
| 6,736,170 B2 * | 5/2004 | Eriksen et al. | ................... | 141/38 |
| 6,789,581 B2 * | 9/2004 | Cowan et al. | .................... | 141/38 |
| 6,964,284 B2 * | 11/2005 | Eckhardt | ......................... | 141/38 |
| 7,694,698 B2 * | 4/2010 | Marini | .............................. | 141/38 |
| 7,798,183 B2 * | 9/2010 | Cegelski et al. | ................ | 141/38 |
| 7,891,385 B2 * | 2/2011 | Yanagi et al. | .................... | 141/38 |
| 8,181,676 B2 * | 5/2012 | Steele et al. | ..................... | 141/38 |
| 8,276,624 B2 * | 10/2012 | Steele et al. | ..................... | 141/38 |
| 8,336,581 B2 * | 12/2012 | Lolli et al. | ....................... | 141/38 |
| 8,439,089 B2 * | 5/2013 | Guan et al. | ..................... | 141/351 |
| 8,505,591 B2 * | 8/2013 | Eckhardt | ......................... | 141/38 |
| 8,627,857 B2 * | 1/2014 | Chou | ............................... | 141/38 |
| 8,631,840 B2 * | 1/2014 | Lolli et al. | ....................... | 141/38 |
| 8,746,292 B2 * | 6/2014 | Lolli et al. | ....................... | 141/38 |
| 8,746,293 B2 * | 6/2014 | Chou | ............................... | 141/38 |
| 8,752,595 B2 * | 6/2014 | Marini | ............................ | 141/38 |
| 2003/0056851 A1 * | 3/2003 | Eriksen et al. | ................... | 141/38 |
| 2008/0190489 A1 * | 8/2008 | Wrubel et al. | ................ | 137/231 |
| 2009/0050232 A1 * | 2/2009 | Guan et al. | ...................... | 141/38 |
| 2011/0011217 A1 * | 1/2011 | Kojima | .......................... | 81/15.2 |
| 2011/0155280 A1 * | 6/2011 | Eckhardt | ......................... | 141/38 |
| 2013/0105055 A1 * | 5/2013 | Chou | ............................. | 152/416 |

* cited by examiner

*Primary Examiner* — Nicolas A Arnett
(74) *Attorney, Agent, or Firm* — Alan D. Kamrath; Kamrath IP Lawfirm, P.A.

(57) ABSTRACT

A vehicle-carried air compressor device includes a case installed with an air compressor therein, a tire repairing container containing a liquid adhesive, and a flexible linking tube. An air inlet coupler of the tire repairing container is connected with an air outlet manifold of the air compressor. An end of the flexible linking tube is coupled to an adhesive outlet coupler of the tire repairing container, and the other end of the flexible linking tube is provided with a protection adapter for coupling to a tire nipple. Before the protection adapter is connected with the tire nipple, the other end of the flexible linking tube is closed by the protection adapter, so that the liquid adhesive in the tire repairing container will not shoot out suddenly because of improper handling.

8 Claims, 10 Drawing Sheets

FIG. 10 ical adhesive in the tire repairing container will not
shoot out suddenly because of improper handling.

VEHICLE-CARRIED AIR COMPRESSOR DEVICE

BACKGROUND OF THE INVENTION

1. Field of the Invention

The present invention relates to an air compressor device and, more particularly, to a vehicle-carried air compressor device which can mend or seal damaged tires with an adhesive or a puncture-sealing agent and inflate them.

2. Description of the Related Art

A conventional air compressing apparatus for repairing and inflating damaged tires includes a case installed with an air compressor therein and a tire repairing container containing a liquid adhesive or puncture-sealing agent. An air inlet coupler and an adhesive outlet coupler are disposed on the tire repairing container. A conduit is connected between the air inlet coupler and an air outlet manifold of the air compressor. The adhesive outlet coupler is connected to an end of a flexible linking tube, and the other end of the flexible linking tube is adapted to be connected to an air nipple of a damaged tire. When the case is started by a DC power of an automobile while the flexible linking tube is connected to the air nipple of the tire, pressurized air will be generated by the air compressor to force the liquid adhesive within the tire repairing container to flow out and enter into the tire through the flexible linking tube, so that a process of sealing and inflating can be completed. However, during the process of mending or sealing with the liquid adhesive, if a power source is connected under conditions that a user did not notice a power switch status of the case is ON (the power switch of the case may be switched to ON status) and that the user has not connected the flexible linking tube to the air nipple of the tire, the liquid adhesive in the tire repairing container will shoot out suddenly from the other end of the flexible linking tube, and then the user or other articles will get contaminated.

BRIEF SUMMARY OF THE INVENTION

Thus, an objective of the present invention is to provide a vehicle-carried air compressor device to improve the aforementioned problems. The air compressor device of the present invention can be used for rescue works of air inflation and tire sealing up, and a liquid adhesive in a tire repairing container will not shoot out suddenly due to improper handling.

To achieve this and other objectives, a vehicle-carried air compressor device of the present invention includes a case having an air compressor therein, a tire repairing container containing a liquid adhesive for sealing automobile tires, and a flexible linking tube including a first end coupled to an adhesive outlet coupler of the tire repairing container and a second end provided with a protection adapter for connecting with an air nipple of a tire. The tire repairing container includes an air inlet coupler connected with the air compressor. The protection adapter includes an outer sleeve, a valve cock, and a connecting base. The outer sleeve includes an axial hole extending through the outer sleeve along an axis. The axial hole includes a first end having an opening therein and a second end having a coupling portion for connecting with the air nipple of the tire. An annular supporting protrusion is formed on an inner wall of the axial hole between the first and second ends of the axial hole along the axis. A valve seat is formed on the inner wall of the axial hole between the supporting protrusion and the opening of the first end of the axial hole and includes an end opening formed in an outer end face of the valve seat. The valve cock is received in the axial hole of the outer sleeve and includes a pole body having front and rear ends spaced along the axis. The valve cock further includes a blocking ring securely mounted in the rear end of the pole body. An engaging ring is mounted on the front end of the pole body with a gap formed between the pole body and the engaging ring. A spring is mounted around the pole body and received in the axial hole of the outer sleeve between the supporting protrusion and the coupling portion. The spring biases the pole body towards the second end of the axial hole so that the blocking ring is pressed against the valve seat to close the end opening of the valve seat. The connecting base includes a connecting section and a cylindrical section with a cylindrical chamber therein. The cylindrical section extends through the opening and is received in the first end of the axial hole of the outer sleeve. A portion of the connecting section is protruded outside of the opening of the outer sleeve and connected with the second end of the flexible linking tube. The air nipple moves the pole body toward the connecting base to compress the spring to open the end opening of the valve seat when the air nipple of the tire is engaged with the coupling portion of the outer sleeve. Before the tire nipple is connected with the outer sleeve of the protection adapter, the flexible linking tube is closed by the protection adapter, so that the liquid adhesive in the tire repairing container will not shoot out suddenly because of improper handling.

In a preferred form, the case includes a coupling indentation therein. The air compressor includes an air outlet manifold. The tire repairing container includes a lid covering an opening formed in the tire repairing container, and the air inlet coupler and the adhesive outlet coupler are provided on the lid. The tire repairing container is engaged to the coupling indentation of the case with the opening pointing downward. The air inlet coupler is connected to the air outlet manifold of the air compressor.

In a preferred form, the supporting protrusion includes first and second end faces spaced along the axis. An enlarged head is formed on the rear end of the pole body, and a flange is formed on the pole body between the head and the front end of the pole body, defining an annular groove between the flange and the head. The blocking ring is mounted in the annular groove. The flange of the pole body is pressed against the first end face of the supporting protrusion by the spring.

The present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

DETAILED DESCRIPTION OF THE INVENTION

Figure 1:
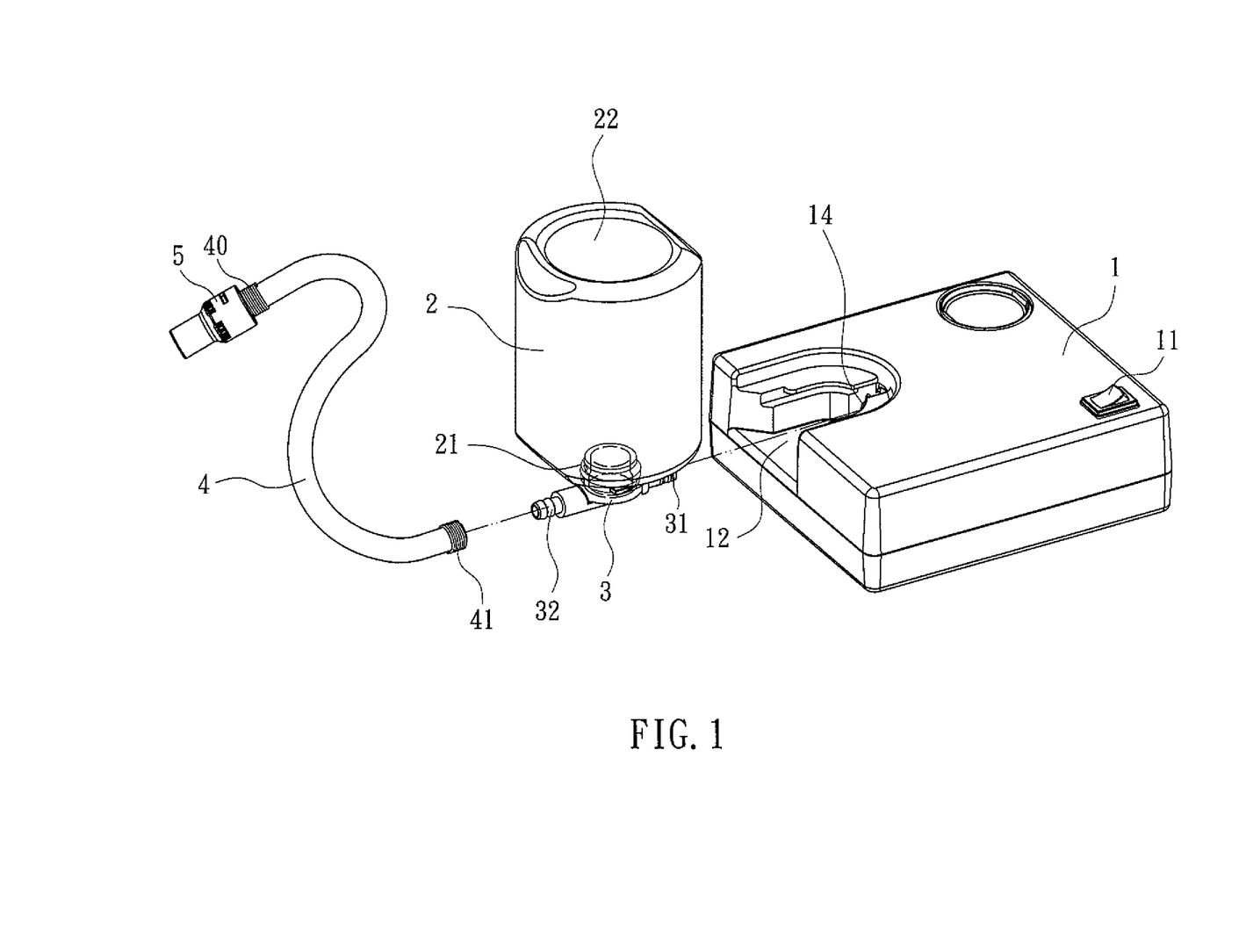
FIG. 1 is an exploded, perspective view of a vehicle-carried air compressor device of the present invention.
Figure 2:
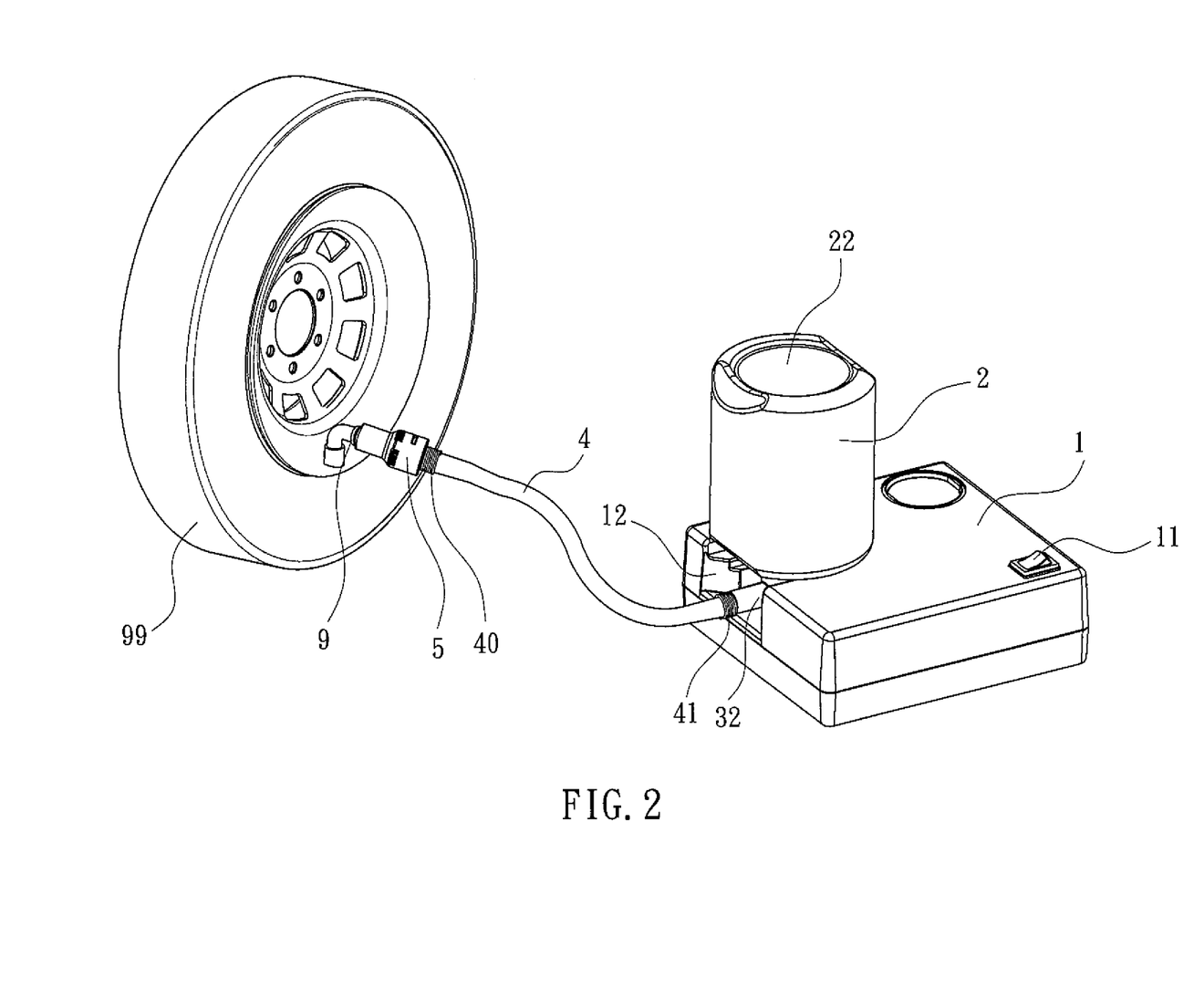
FIG. 2 is an illustration of the air compressor device of FIG. 1 being applied in sealing and pumping up of an automobile tire.
Figure 3:
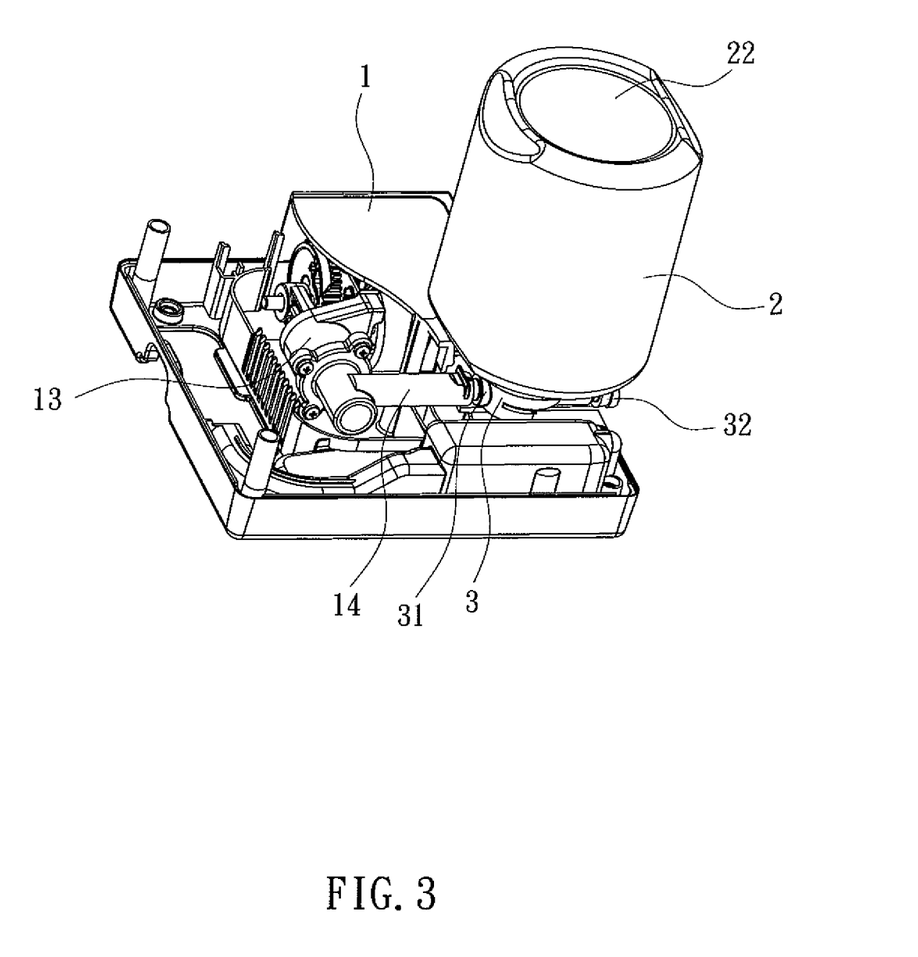
FIG. 3 is a partial, sectioned view of a case of the air compressor device of FIG. 1, with a tire repairing container of the air compressor device mounted on the case.

FIG. 1 shows an air compressor device of the present invention applicable to be carried in an automobile to perform rescue works of repair and inflation for a damaged tire 99 (see FIG. 2). The air compressor device includes a case 1, a tire repairing container 2, and a flexible linking tube 4.

Referring to FIGS. 1 through 10, the case 1 includes a switch 11 thereon and a coupling indentation 12 therein. An air compressor 13 is installed inside the case I and includes an air outlet manifold 14 having an end located in the coupling indentation 12. The tire repairing container 2 includes a bottom wall 22 and an opening 21 disposed in a side opposite to bottom wall 22 and covered with a lid 3. An air inlet coupler 31 and an adhesive outlet coupler 32 are provided on the lid 3. The tire repairing container 2 is engaged to the coupling indentation 12 of the case 1 with the opening 21 pointing downward and with the air inlet coupler 31 of the lid 3 connected to the air outlet manifold 14 of the air compressor 13. A connector or a fixing ring 41 is provided on a first end of the flexible linking tube 4 and coupled to the adhesive outlet coupler 32 of the lid 3. Further, a protection adapter 5 is provided on a second end of the flexible linking tube 4. When the tire 99 needs to be sealed and inflated, the protection adapter 5 of the flexible linking tube 4 is connected with an air nipple 9 of the tire 99, and the case 1 is started by a DC power of an automobile or other DC power sources, so that pressurized air is generated by the air compressor 13 to force the liquid adhesive in the tire repairing container 2 to flow out, and enter into the tire 99 through the flexible linking tube 4. Thus, a process of sealing and inflating can be completed.

A main feature of the vehicle-carried air compressor device of the present invention is the provision of the protection adapter 5 on the flexible linking tube 4. The protection adapter 5 includes a cylindrical outer sleeve 6, a valve cock 7, and a cylindrical connecting base 8.

The outer sleeve 6 includes an axial hole 62 extending therethrough along an longitudinal axis thereof. The axial hole 62 includes a first end having an opening 60 therein and a second end having a coupling portion 61 and having a diameter smaller than that of the first end of the axial hole 62. In this embodiment, the coupling portion 61 is a female thread formed on an inner wall of the axial hole 62. An annular supporting protrusion 623 is formed on the inner wall of the axial hole 62 between the first and second ends of the axial hole 62 along the axis and includes first and second end faces 66 and 67 spaced along the axis (see FIG. 5). A shoulder 621 is formed on the inner wall of the axial hole 62 between the supporting protrusion 623 and the coupling portion 61 of the second end of the axial hole 62. A valve seat 625 is formed on the inner wall of the axial hole 62 between the supporting protrusion 623 and the opening 60, and an annular receiving groove 626 is formed between the valve seat 625 and the inner wall of the axial hole 62 in a radial direction of the axial hole 62. The valve seat 625 includes an end opening 627 in an outer end face 629 of the valve seat 625. The end opening 627 includes a conical inner periphery 624 tapering from the outer end face 629 of the valve seat 625 toward the supporting protrusion 623. Two inclined recesses 64 are formed oppositely in the inner wall of the first end of the axial hole 62 of the outer sleeve 6 adjacent to the opening 60. Two through-holes 63 are formed oppositely in the outer sleeve 6 between the opening 60 and the valve seat 625 along the axis.

Figure 4:
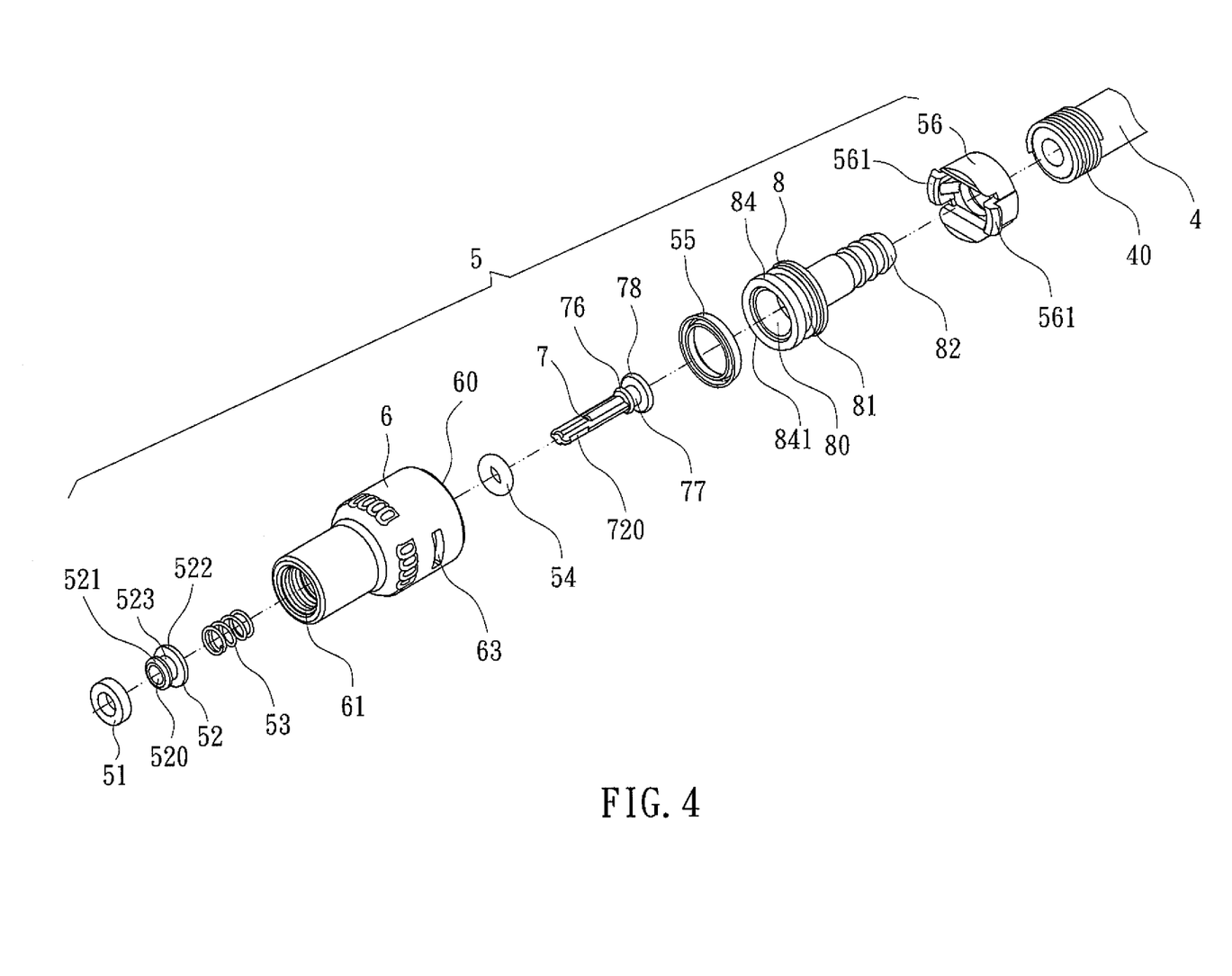
FIG. 4 is an exploded, perspective view of a protection adapter of the air compressor device of FIG 1.
Figure 5:
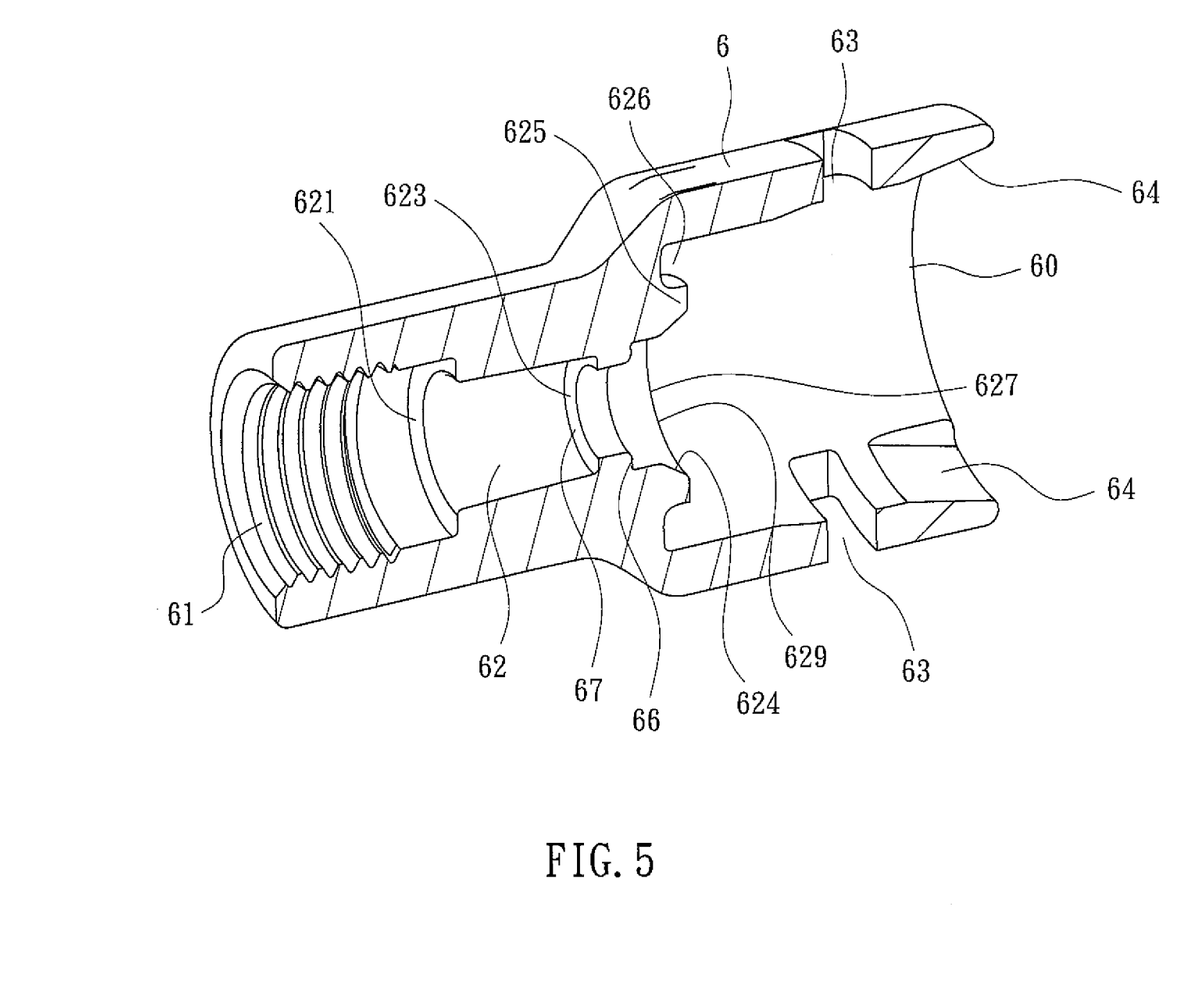
FIG. 5 is a sectioned view of an outer sleeve of the protection adapter of FIG. 4.
Figure 6:
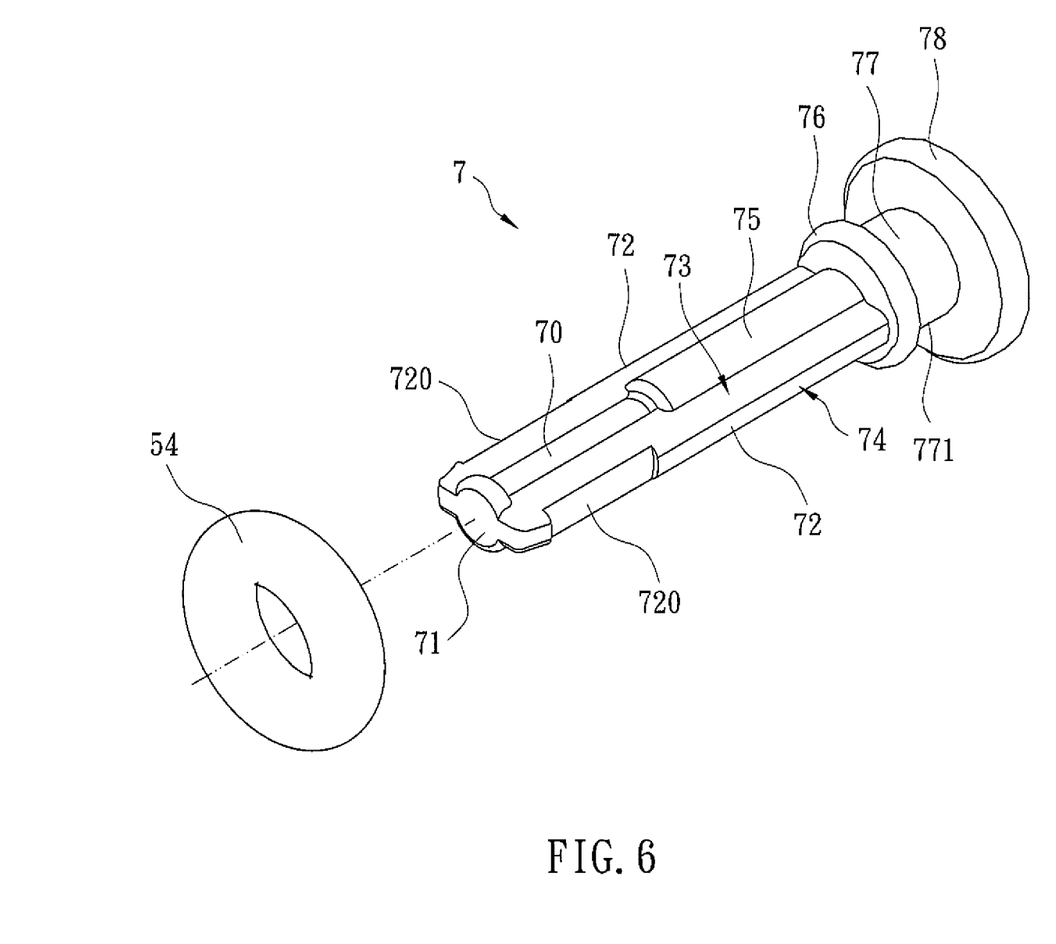
FIG. 6 is an enlarged view of a valve cock and a blocking ring of the protection adapter of FIG. 4.
Figure 7:
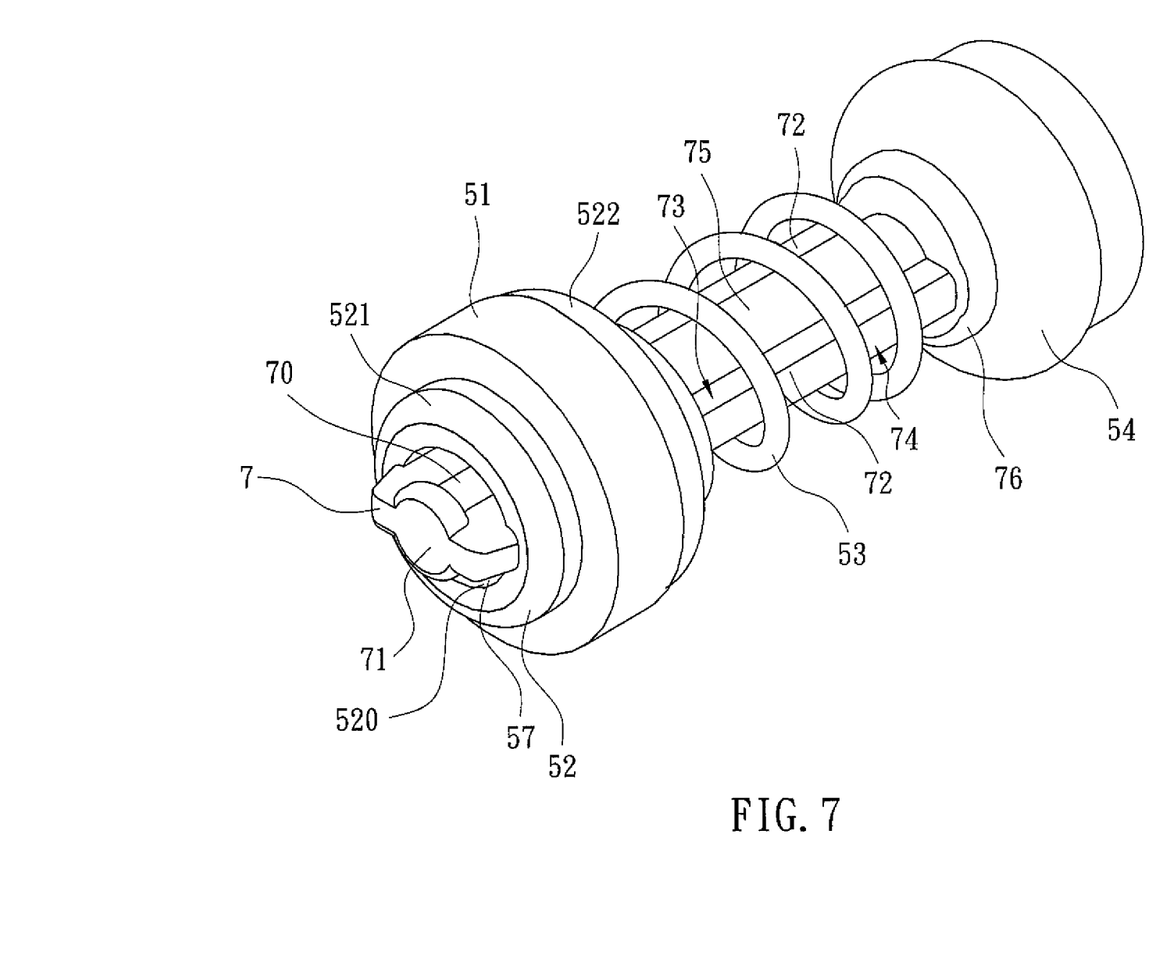
FIG. 7 is a perspective view showing the blocking ring, a spring, an engaging ring, and a buffer ring mounted on a pole body of the valve cock.
Figure 8:
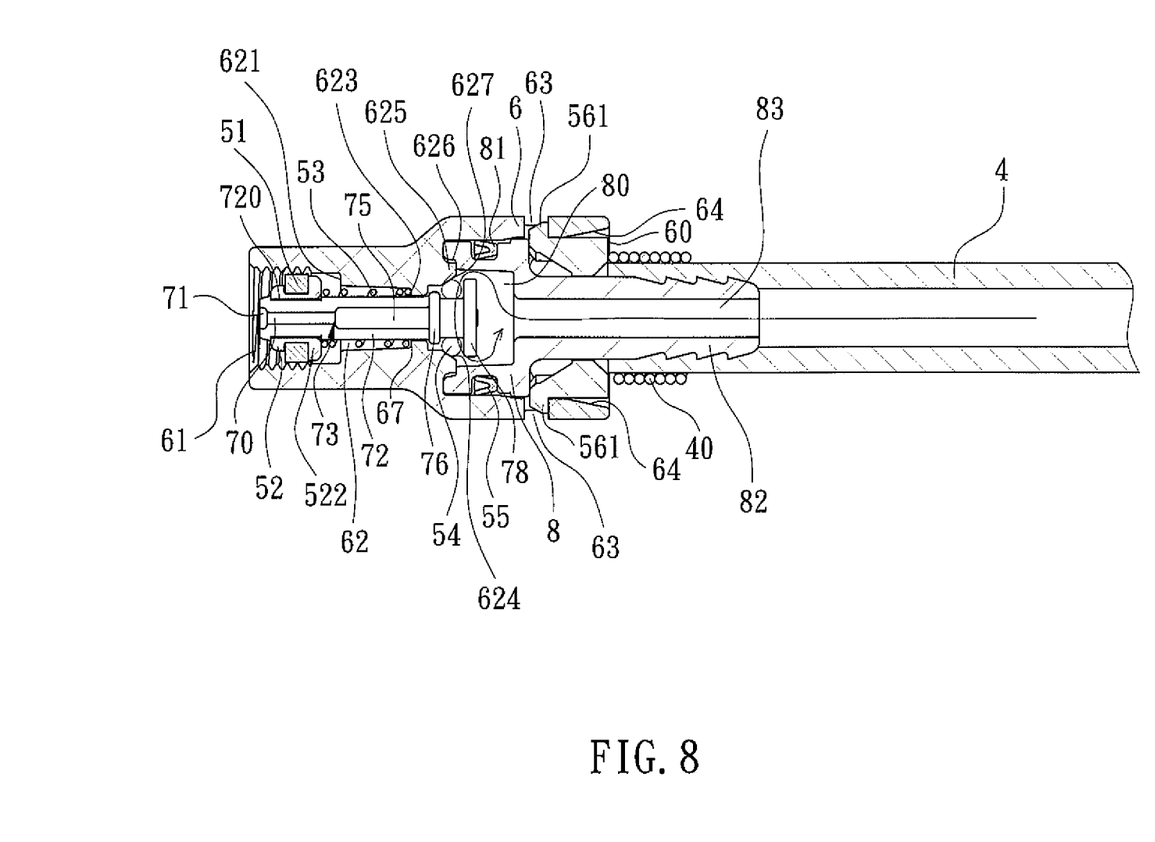
FIG. 8 is a cross-sectional assembly view of the protection adapter and a flexible linking tube of the air compressor device of FIG. 1.

The valve cock 7 is received in the axial hole 62 of the outer sleeve 6 and includes a pole body 70 having a front end 71 and a rear end 77 spaced from the front end 71 along the axis. An enlarged head 78 is formed on the rear end 77, and a flange 76 is formed on the pole body 70 between the front end 71 and the head 78, defining an annular groove 771 between the flange 76 and the head 78. The valve cock 7 further includes a blocking ring 54 made of rubber elastic material and securely mounted in the annular groove 771. Two opposite side wings 72 are formed on the pole body 70 and extends between the front end 71 and the flange 76 along the axis, defining two opposite wide faces 73 with a large area and two opposite narrow faces 74 with a area smaller than that of wide faces 73. In this embodiment, two recessions 720 are respectively formed in the side wings 72 adjacent to the front end 71 of the pole body 70, and an engaging ring 52 is mounted in the recessions 720 with the front end 71 of the pole body 70 extending through a central hole 520 of the engaging ring 52, so that a spacing or gap 57 is formed between the pole body 70 and the engaging ring 52. The engaging ring 52 includes front and rear flanges 521 and 522 spaced along the axis and an annular engaging groove 523 formed between the front and rear flanges 521 and 522 (FIG. 4). A buffer ring 51 is mounted in the engaging groove 523 and located in the coupling portion 61 of the second end of the axial hole 62. Two protruded ribs 75 are oppositely formed on the wide faces 73 of the pole body 70 and extended between the recessions 720 and the flange 76 along the axis for enhancing the structural strength of the pole body 70. A spring 53 is mounted around the side wings 72 of the pole body 70 and received in the axial hole 62 of the outer sleeve 6 between the supporting protrusion 623 and the coupling portion 61. In this embodiment, two ends of the spring 53 are respectively pressed against the second end face 67 of the supporting protrusion 623 and the rear flange 522 of the engaging ring 52 to bias the pole body 70 towards the second end of the axial hole 62, so that the flange 76 of the pole body 70 is pressed against the first end face 66 of the supporting protrusion 623 to position the valve cock 7 in place (see FIG. 8).

The connecting base 8 includes a connecting section 82 and a cylindrical section 84 with a cylindrical chamber 80 therein. The cylindrical section 84 of the connecting base 8 extends through the opening 60 and is received in the first end of the axial hole 62 of the outer sleeve 6 with an outer end 841 of the cylindrical section 84 engaged in the receiving groove 626 of the outer sleeve 6 and with the cylindrical chamber 80 receiving the rear end 77 of the pole body 70. A portion of the connecting section 82 is protruded outside of the opening 60 of the outer sleeve 6, and a passage 83 is formed in the connecting section 82 and in communication with the cylindrical chamber 80. An annular groove 81 is formed in an outer wall of the cylindrical section 84 of the connecting base 8, and a sealing ring 55 with a U-shaped cross section is disposed in the annular groove 81 and in contact with the inner wall of the axial hole 62 of the outer sleeve 6. Further, a retaining ring 56 is sleeved on an outer circumference of the connecting section 82 of the connecting base 8 and received in the axial hole 62 of the cylindrical outer sleeve 6. The retaining ring 56 includes two resilient buckle blocks 561 formed on one end thereof and engaged with the through-holes 63 of the outer sleeve 6 via the inclined recesses 64 to secure the connecting base 8 inside the outer sleeve 6. The connecting section 82 of the connecting base 8 is connected with the second end of the flexible linking tube 4, and a fixing ring 40 is mounted around the second end of the flexible linking tube 4 to securely connect the protection adapter 5 with the flexible linking tube 4. Since an inner diameter of the retaining ring 56 is larger than an outer diameter of the connecting section 82, the outer sleeve 6 and the valve cock 7 can turn synchronously so that the flexible linking tube 4 will not be coiled when the outer sleeve 6 is screwed together with the air nipple 9.

In assembly, the pole body 70 with the blocking ring 54 is received in the axial hole 62 of the outer sleeve 6 from the opening 60 with the front end 71 of the pole body 70 located in the second end of the axial hole 62, and then the spring 53 and the engaging ring 52 with the buffer ring 51 are engaged around the front end 71 of the pole body 70 from the second end of the axial hole 62. After the valve cock 7 and the spring 53 are assembled inside the axial hole 62 of the outer sleeve 6, the buffer ring 51 is in contact with the inner wall of the axial hole 62, the flange 76 of the pole body 70 is pressed against the first end face 66 of the supporting protrusion 623 and the blocking ring 54 is pressed against the conical inner periphery 624 of the valve seat 625 by an elasticity of the spring 53 so that the end opening 627 of the valve seat 625 is closed by the blocking ring 54. On the other hand, when the valve cock 7 is moved inwards, the blocking ring 54 of the valve cock 7 moves away from the valve seat 625 until the engaging ring 52 abuts against the shoulder 621 of the outer sleeve 6, so that the end opening 627 of the valve seat 625 is opened.

Figure 9:
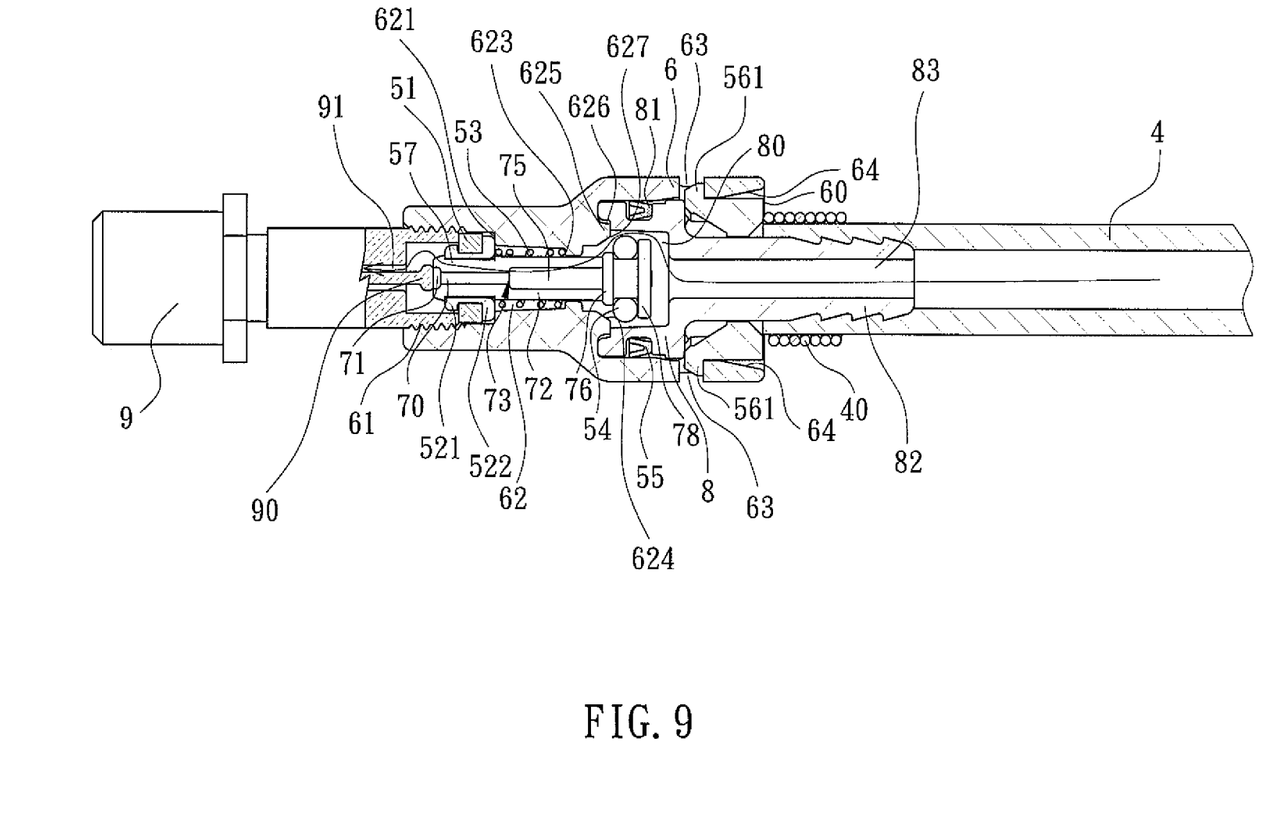
FIG. 9 is a cross-sectional view showing an air nipple of the tire inserted into a coupling portion of the outer sleeve of the protection adapter of FIG. 8.
Figure 10:
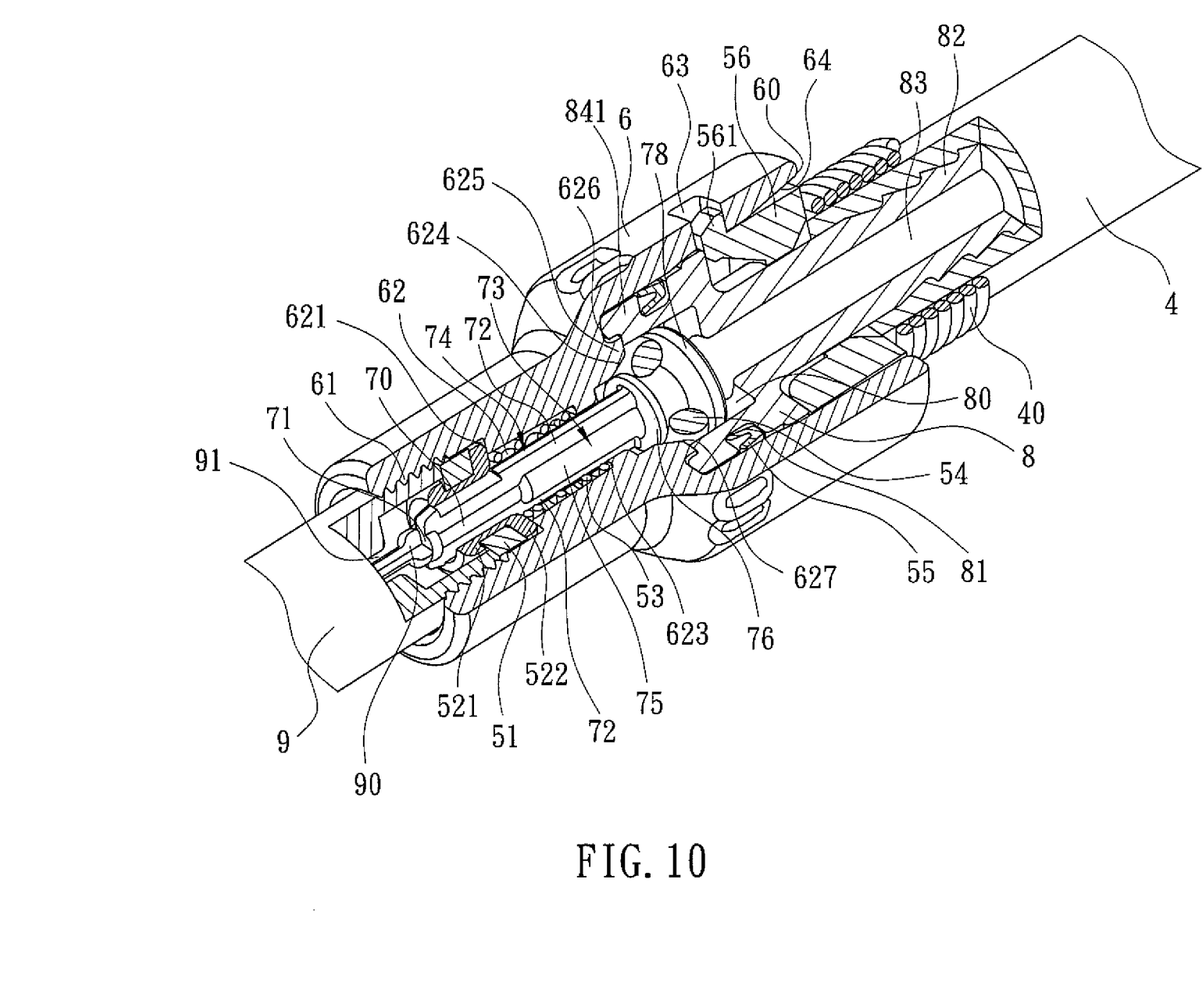
FIG. 10 is a partial, sectioned view showing the nipple of the tire inserted into the coupling portion of the outer sleeve of the protection adapter of FIG. 8.

When the air compressor device of the present invention is applied in tire sealing with adhesive, firstly, the air nipple 9 of the tire 99 is screwed together with the coupling portion 61 of the axial hole 62 of the outer sleeve 6 (see FIGS. 9 and 10). By having the axial pole 90 of the air nipple 9 in contact with the front end 71 of the pole body 70 of the valve cock 7, the pole body 70 is moved toward the connecting base 8 to compress the spring 53 to open the end opening 627 of the valve seat 625. At this point, the liquid adhesive will be pushed by the pressurized air generated from the air compressor 13 and enters into the cylindrical chamber 80 through the passage 83 of the connecting base 8, and, thus, enters into the tire 99 through the axial hole 62 of the outer sleeve 6, the end opening 627, the gap 57 between the pole body 70 and the engaging ring 52, and a passage 91 of the air nipple 9, and at the same time, the pressurized air enters into the tire 99 to inflate air. Furthermore, before the air nipple 9 of the tire 99 is inserted into the outer sleeve 6 to move the pole body 70 of the valve cock 7, the blocking ring 54 of the valve cock 7 is in close contact with the conical inner periphery 624 of the valve seat 625 by the spring 53 so that the end opening 627 of the valve seat 625 is closed. Thus, even though the user has the power connected without noticing the switch 11 of the case 1 is turned on, the liquid adhesive in the tire repairing container 2 will not flow out through the flexible linking tube 4. Therefore, with the protection adapter 5, the problem of the liquid adhesive shooting out suddenly because of improper handling can be prevented from happening.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A vehicle-carried air compressor device, comprising:
a case having an air compressor therein;
a tire repairing container containing a liquid adhesive for sealing automobile tires, with the tire repairing container including an adhesive outlet coupler and an air inlet coupler connected with the air compressor;
a flexible linking tube including a first end coupled to the adhesive outlet coupler of the tire repairing container and a second end provided with a protection adapter for connecting with an air nipple of a tire, with the protection adapter comprising:
an outer sleeve including an axial hole extending through the outer sleeve along an axis, with the axial hole including a first end having an opening therein and a second end having a coupling portion for connecting with the air nipple of the tire, with an annular supporting protrusion formed on an inner wall of the axial hole between the first and second ends of the axial hole along the axis, with a valve seat formed on the inner wall of the axial hole between the supporting protrusion and the opening of the first end of the axial hole, with the valve seat including an end opening formed in an outer end face of the valve seat;
a valve cock received in the axial hole of the outer sleeve and including a pole body having front and rear ends spaced along the axis, with the valve cock further including a blocking ring securely mounted in the rear end of the pole body, with an engaging ring mounted on the front end of the pole body and a gap formed between the pole body and the engaging ring, with a spring mounted around the pole body and received in the axial hole of the outer sleeve between the supporting protrusion and the coupling portion, with the spring biasing the pole body towards the second end of the axial hole so that the blocking ring is pressed against the valve seat to close the end opening of the valve seat; and
a connecting base including a connecting section and a cylindrical section with a cylindrical chamber therein, with the cylindrical section extending through the opening and received in the first end of the axial hole of the outer sleeve, with a portion of the connecting section protruded outside of the opening of the outer sleeve and connected with the second end of the flexible linking tube;
wherein the air nipple moves the pole body toward the connecting base to compress the spring to open the end opening of the valve seat when the air nipple of the tire is engaged with the coupling portion of the outer sleeve.

2. The air compressor device according to claim 1, with the case including a coupling indentation therein, with the air compressor including an air outlet manifold, with the tire repairing container including a lid covering an opening formed in the tire repairing container, with the air inlet coupler and the adhesive outlet coupler provided on the lid, with the tire repairing container engaged to the coupling indentation of the case, with the opening pointing downward, with the air inlet coupler connected to the air outlet manifold of the air compressor.

3. The air compressor device according to claim 2, with the supporting protrusion including first and second end faces spaced along the axis, with the spring including two ends respectively pressed against the second end face of the supporting protrusion and the engaging ring, with the end opening of the valve seat including a conical inner periphery tapering from the outer end of the valve seat toward the supporting protrusion, with the blocking ring pressed against the conical inner periphery of the valve seat by the spring.

4. The air compressor device according to claim 3, with an enlarged head formed on the rear end of the pole body, with a flange formed on the pole body between the head and the front end of the pole body, defining an annular groove between the flange and the head, with the blocking ring mounted in the annular groove, with the flange of the pole body pressed against the first end face of the supporting protrusion by the spring.

5. The air compressor device according to claim 4, with two opposite side wings formed on the pole body and extending between the front end and the flange of the pole body along the axis, defining two opposite wide faces and two opposite narrow faces with a area smaller than that of the wide faces, with two recessions respectively formed in the side wings adjacent to the front end of the pole body, with the engaging ring mounted in the recessions, with the engaging ring including front and rear flanges spaced along the axis and an annular engaging groove formed between the front and rear flanges, with a buffer ring mounted in the engaging groove of the engaging ring and being in contact with the inner wall of the second end of the axial hole.

6. The air compressor device according to claim 5, with an annular receiving groove formed between the valve seat and the inner wall of the first end of the axial hole in a radial direction of the axial hole, with an outer end of the cylindrical section engaged in the receiving groove of the outer sleeve, with the cylindrical chamber receiving the rear end of the pole body.

7. The air compressor device according to claim 6, with two inclined recesses formed oppositely in the inner wall of the first end of the axial hole of the outer sleeve adjacent to the opening, with two through-holes formed oppositely in the outer sleeve between the opening and the valve seat along the axis, with a retaining ring sleeved on the connecting section of the connecting base and received in the axial hole of the cylindrical outer sleeve, with the retaining ring including two resilient buckle blocks formed on one end thereof and respectively engaged in the through-holes of the outer sleeve via the inclined recesses to secure the connecting base inside the outer sleeve.

8. The air compressor device according to claim 7, with an annular groove formed in an outer wall of the cylindrical section of the connecting base, with a sealing ring disposed in the annular groove of the cylindrical section and in contact with the inner wall of the axial hole of the outer sleeve.

* * * * *